J. R. ROGERS.
LINE CASTING MACHINE.
APPLICATION FILED JUNE 7, 1910.

1,088,728.

Patented Mar. 3, 1914.
4 SHEETS—SHEET 1.

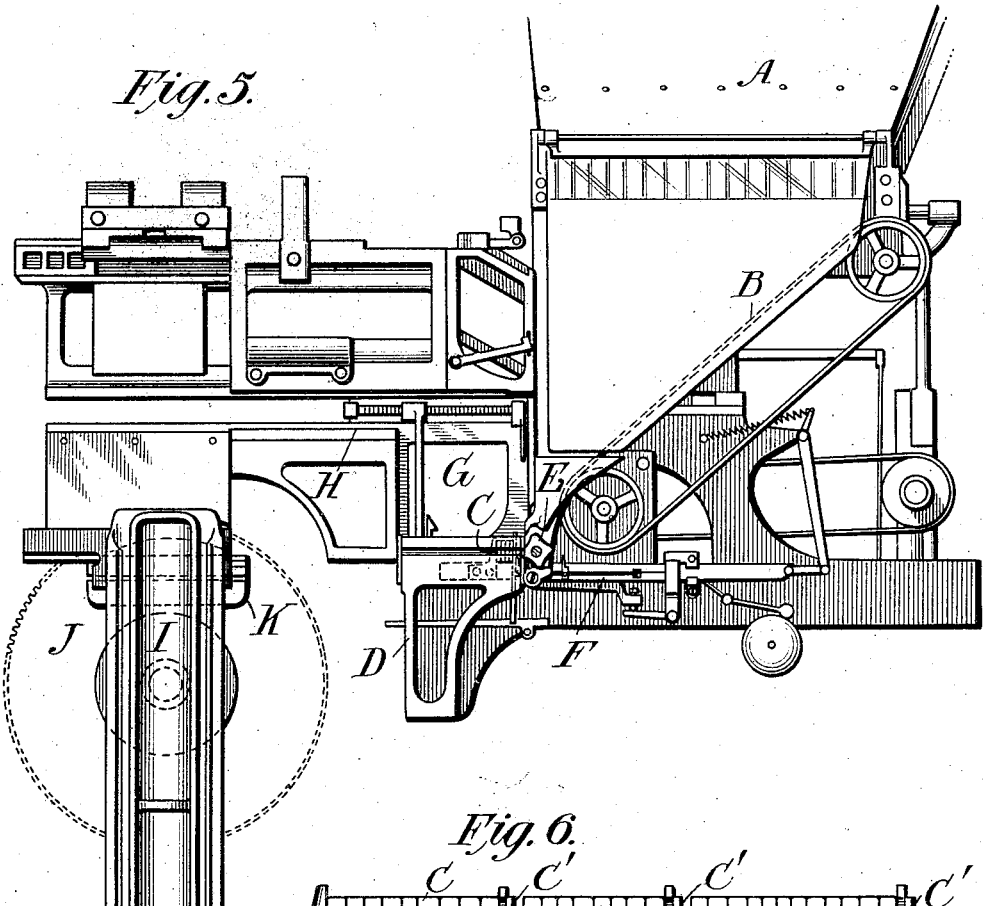
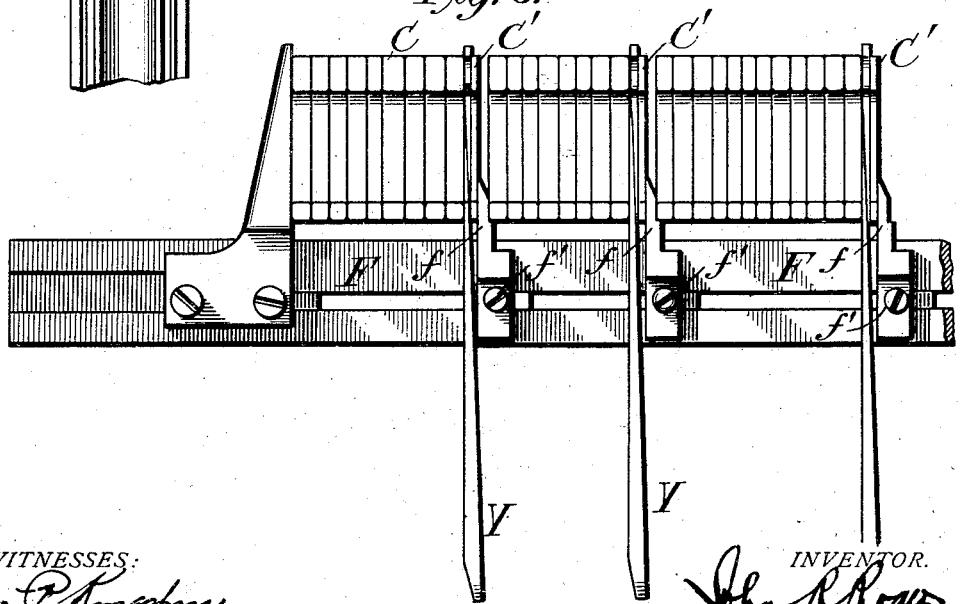

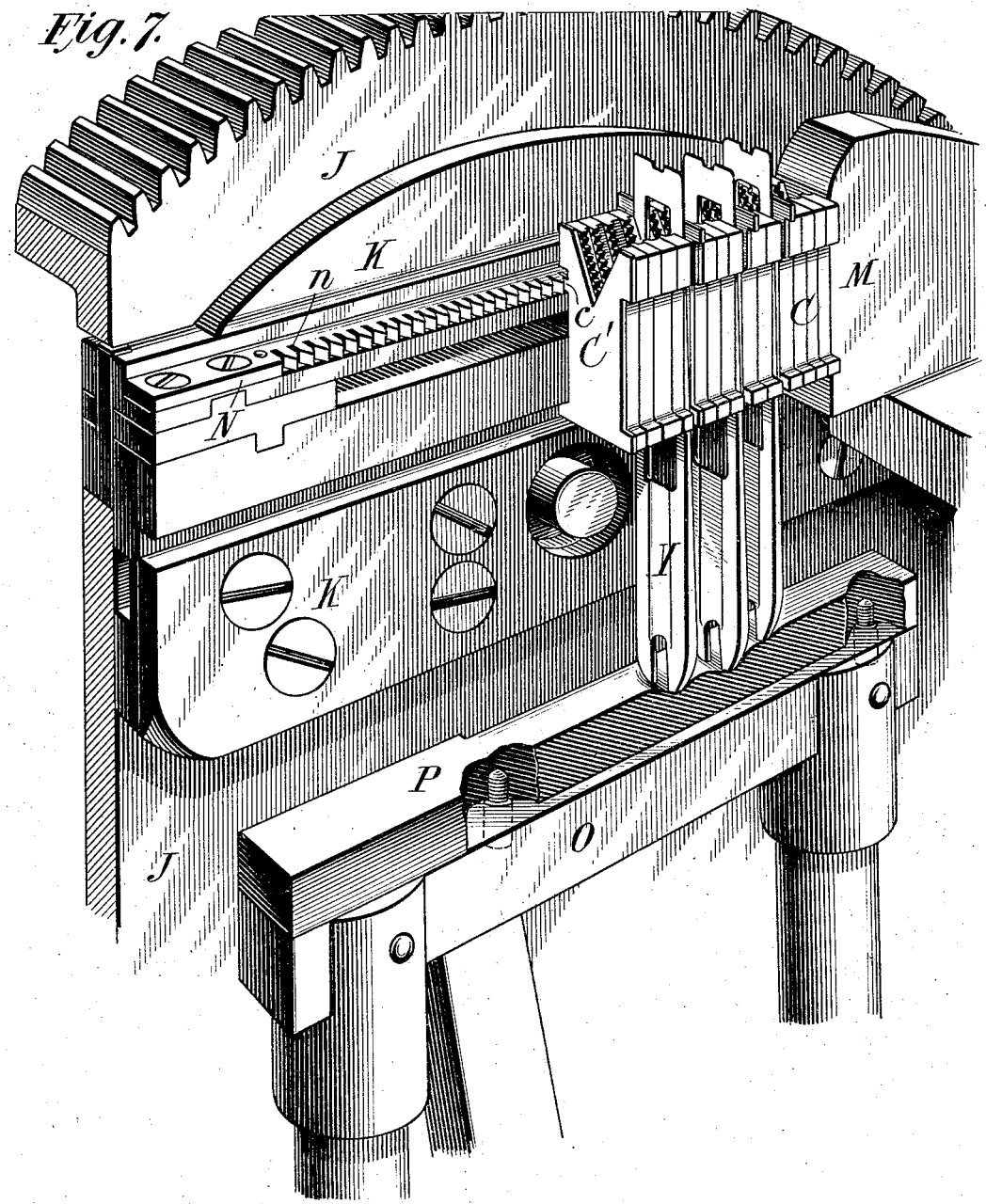

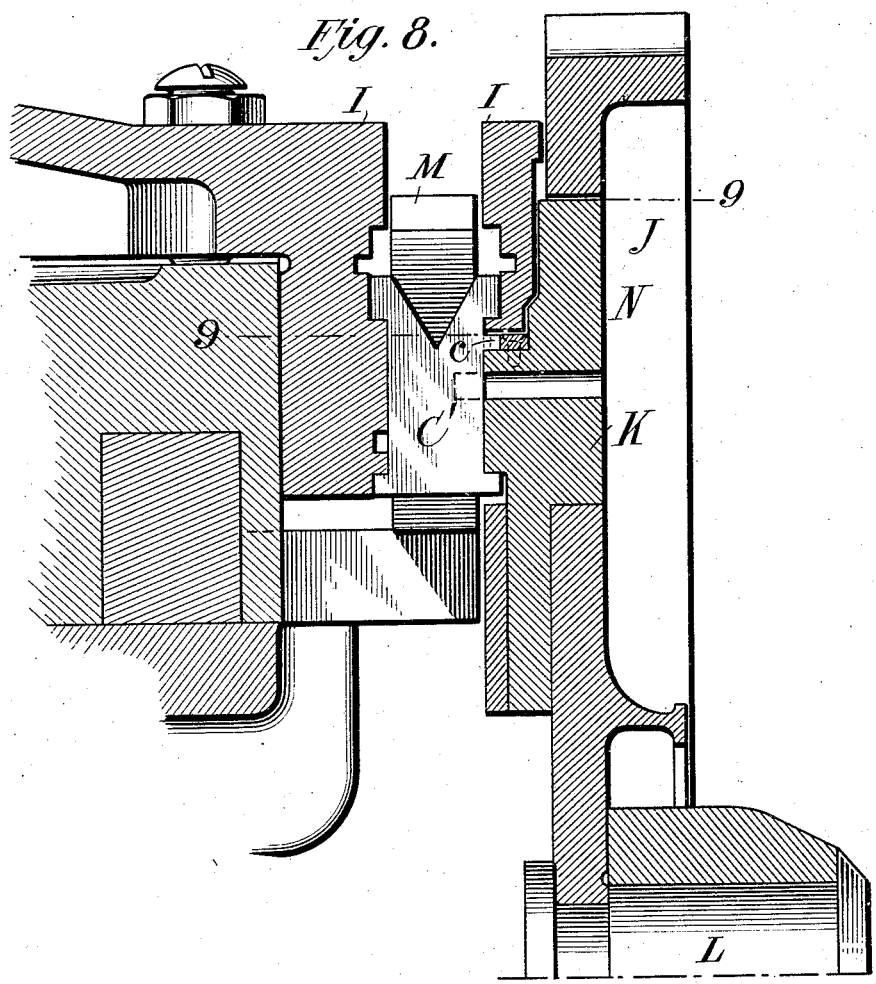
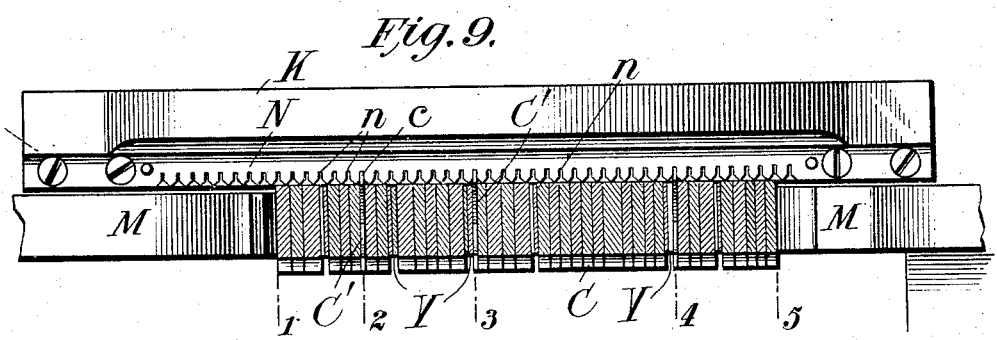

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINE-CASTING MACHINE.

1,088,728.　　　　Specification of Letters Patent.　　Patented Mar. 3, 1914.

Application filed June 7, 1910.　Serial No. 565,516.

*To all whom it may concern:*

Be it known that I, JOHN R. ROGERS, of the borough of Brooklyn, county of Kings, and State of New York, have invented a new and useful Improvement in Line-Casting Machines, of which the following is a specification.

This invention has reference to line casting machines, in which circulating matrices are assembled in line, the line presented momentarily to the face of a slotted mold in order to form type characters in a slug cast therein, and the matrices thereafter distributed preparatory to their use in new combinations.

The invention is applicable to all machines of the class named. For purposes of illustration I have it incorporated in a machine of the Mergenthaler type having the general organization represented in Letters Patent of the United States No. 436,532, now in extensive commercial use, and familiar to all persons skilled in the art.

The object of the invention is to secure the speedy and accurate composition of what is known as tabular matter, that is to say matter in which the figures or other characters in one line fall directly below those in the line above, that they may appear in vertical columns in the print, with or without vertical rules between the columns.

To this end the invention consists in the means whereby groups of matrices in the composed line, belonging to separate columns, are held in definite positions before the mold, in order that the vertical rules or spaces between the columns will register exactly on the adjoining slugs in the form.

The invention also consists in the combination of means for composing each matrix line in groups of definite length, with means for maintaining the proper relationship of these groups when presented to the mold.

The invention consists also in combining with the composed groups of matrices, and means for maintaining their positions in front of the mold, expansible spacers or justifiers for the respective groups, and means for advancing and expanding the spacers independently, so that each group may be exactly justified.

It further consists in various details which will be hereinafter described.

Figure 1:
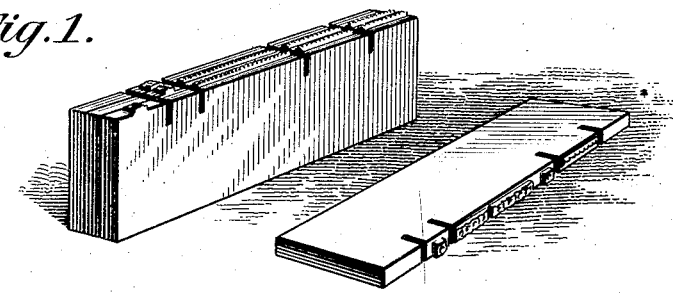
Figure 2:
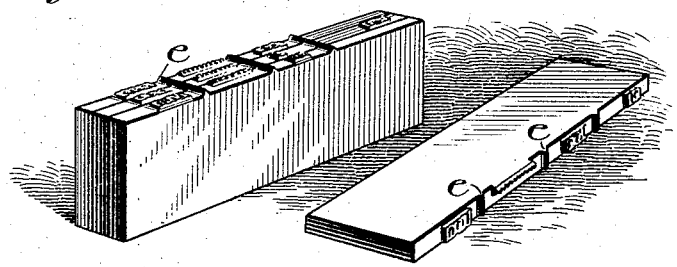
Figure 3:
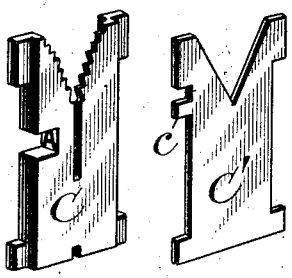
Figure 4:
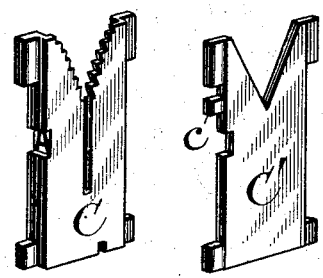

In the drawings,—Figure 1 is a perspective view of tabular slugs such as my mechanism is designed to produce, these slugs having shallow slots to receive the vertical column rules. Fig. 2 is a perspective view of tabular slugs of another form which may be produced by my mechanism, the column rules being formed upon the slugs. Fig. 3 is a perspective view showing a matrix and a space such as are used in my mechanism for producing the slugs shown in Fig. 1, these members being of the character represented in U. S. Letters Patent No. 791,165, of May 30, 1905, to J. R. Rogers. Fig. 4 is a perspective view of matrices and spacers such as are used in my mechanism for producing slugs such as shown in Fig. 2, both being of the same general character as those used in commercial Mergenthaler machines of the present day. Fig. 5 is a diagram illustrating the general organization of the machine. Fig. 6 is a front elevation showing the assembler in which the groups of matrices and spacers are composed. Fig. 7 is a perspective view showing the mold, the matrices and adjacent parts of a Mergenthaler machine with my improvements embodied therein. Fig. 8 is a vertical cross section through the mold wheel, first elevator and connected parts. Fig. 9 is a horizontal section on the line 9—9, Fig. 8.

Referring to Fig. 5, A represents the ordinary channeled magazine in which the matrices are contained and from which they are individually delivered in proper order by a finger key mechanism.

B is an inclined, constantly running belt on which the released matrices, C, are received and by which they are directed downward one after another to the end of the line in course of composition.

The character matrices are of the same general form as those used in all Mergenthaler machines, with ears projecting edgewise at the upper and lower ends. The blank matrices or spaces C¹, however, to appear between words, are each constructed as shown in Figs. 3 and 4, with an additional ear, $c$, on the edge which is presented toward the mold.

D is an assembling elevator having a horizontal channel in the top to receive and aline the matrices.

E is the star wheel by which the descending matrices are forced laterally against the end of the line and the line as it increases in length advanced to the left in the assembler D. The assembling elevator D is movably vertically at the will of the operator, so that the composed line may be raised bodily from the assembling level.

F is a yielding resistant, to sustain the forward end of the line, consisting of a horizontal slide having at the left end an upturned finger against which the foremost matrix is supported.

G is a horizontally movable carriage, commonly known as the "transfer carriage," having two depending fingers between which the composed line is presented by the assembler D when the latter is elevated.

H is a stationary guide or channel through which the line is advanced endwise to the left, from the assembler D when the latter is in its elevated position, by the carriage G.

I is the first elevator, so-called, movable vertically and having at its upper end a pair of horizontal jaws to receive and sustain the matrix line when the latter is transferred to the left from the support H by the carriage G. The elevator I serves to lower the line to the casting level in front of the mold, and also to raise it from said level to mechanism by which the line is transferred to the distributing devices.

J is a vertical wheel or disk in which the slotted mold K is mounted. This disk is carried by a central stud L, on a horizontal slide, by which the mold is moved facewise, to and from the line of matrices, when the line is sustained in the casting position as shown in Figs. 7 and 8.

So far as described the parts may all be identical with those in the commercial Mergenthaler machines above referred to.

The line of matrices is composed in the assembler D, lifted by the latter between the fingers of the carriage G, and thereafter transferred by this carriage through the support H into the elevator I, by which the line is finally lowered to the casting position in front of the mold as shown in Fig. 8. At the time the line is thus lowered the mold is in its retracted position. After the line reaches its final level the mold advances facewise against the matrices as shown in Fig. 8, so that the lower edge of the mold overlies the lower ears of the matrices—all of the foregoing actions being the same as in existing machines.

In carrying my invention into effect I first provide means for assembling in one line the groups of matrices corresponding in width to the width of the respective columns in the table to be printed. For this purpose I prefer to use the mechanism shown in Fig. 6 and covered by Letters Patent of the United States No. 924,000, dated June 8, 1909, the assembler slide F being provided with thin vertical fingers $f$ secured in place by screws $f^1$ and adjustable laterally along the bar, so that they may be placed at distances apart corresponding to the required widths of the groups of matrices in the line, or in other words the widths of the columns. By the operation of the machine the matrices are delivered automatically between these fingers.

At the end of each group I deliver to the line a wedge spacer or justifier Y such as commonly used in the Mergenthaler machines, and described in Patent No. 436,532, each consisting of two oppositely tapered wedges connected by a sliding joint, so that the longer wedge may be thrust upward through the line while its companion remains at rest in order to increase the width or thickness of the operative portion in the line. The justifiers used in connection with the respective matrix groups, and independently adjustable, as hereinafter described, will compensate for or fill out those very small or slight shortages which may occur in the respective groups at the time of composition. In other words, the independently adjustable spacers will effect the exact justification of the several groups to the predetermined lengths.

After the composition of the line is completed it is lifted and transferred to the casting position in front of the mold, as before explained. When the line is lifted from the assembler slide F, the spaces represented by the fingers $f$ exist between the groups, but the fingers of the carriage G serve to close the matrices together into a compact or continuous line preparatory to its transfer to the mold. When in front of the mold, the matrix line is confined endwise between the usual jaws M, by which its total length is determined.

In order that the individual groups may be held in their proper relations before the mold and each group limited to its proper length, I fix rigidly to the face of the mold a horizontal bar, N, having at the forward edge pointed teeth of uniform width, the notches $n$ between these teeth being adapted to receive and hold the lips $c$ on the space matrices or spaces C¹, whereby these spaces are prevented from shifting sidewise.

The spaces between the teeth are uniformly spaced preferably an em or half em apart, so that when a line is presented in front of the mold there will be a notch or opening opposite each of the spaces. If the space stands slightly out of line with the notch it is immaterial, as the pointed shape of the teeth will move the space right or left to its proper position as the mold advances toward the matrices. It will be seen that the spaces have their forward edges held securely against lateral movement, and that being thus held they determine exactly the lengths of the several groups of matrices in the line.

As the matrices which can be inserted in any one group will occasionally fail to exactly fill the allotted space, extensible spacers or justifiers, Y, are employed to fill this slight remaining space, which will rarely exceed 1/1000 of an inch. When the spacers are pushed up through the line the groups are expanded or filled out tightly between the spaces, so that a solid matrix line is presented to the mold, the line being composed of groups of the predetermined length.

Owing to the fact that the spaces between the groups are held in definite positions, it is possible to make the groups of one line agree exactly in width with those of the succeeding lines.

As the space to be filled in the several groups may vary, it is necessary to provide for the justification of each group independently of the others. This result is secured by providing a yielding pusher to act upon the longer wedges in series. In the form shown this mechanism consists of the usual vertical, movable bar O, provided on its upper surface with a strip of rubber, P, or equivalent elastic material. When this bar is carried upward it acts upon the series of justifier wedges and drives them upward through the line, each wedge being lifted independently of the others until its advance is arrested by the resistance of the adjacent matrices. Each group of matrices is thus justified independently between two of the fixed spaces $C^1$, or between one of these spaces and a jaw M at the end of the line. In place of the elastic strip P any other device may be used which shall apply upward pressure to the wedges Y regardless of their positions.

When slotted slugs such as shown in Fig. 1 are to be produced, I employ matrices such as shown in Fig. 3, deeply notched at the front and having the matrix proper at the bottom of the notch, so that when a series of these matrices are arranged in front of the mold they will form a continuation of its slot, the slug being cast partly in the mold and partly in the matrices, as explained in Patent 791,165.

For the production of the notches in the slugs I employ spaces $C^1$ such as shown in Fig. 3, these spaces being without the notch in the front edge, as explained in the patent above named. They are, however, provided with the lip $c$ to engage the locking bar N.

If slugs of the form shown in Fig. 2, having the vertical rules $e$ cast thereon are to be produced, I employ matrices and spaces such as shown in Fig. 4, the matrix having the character or matrix proper in one edge near the surface, and the space having the rule matrix in its edge in corresponding position. This space is provided, as before explained, with a lip, $c$, to engage the locking bar of the mold.

When the slugs are to be cast without the raised rules and without the slots, that is to say simply with blank spaces between the groups of characters, I use instead of the rule matrix shown in Fig. 4, a blank space or matrix such as commonly used in Mergenthaler machines, but with a lip $c$ thereon.

While I prefer to make use of the toothed bar N as the most satisfactory means of securing the spaces in the line against lateral movement, it is to be understood that the form of the locking device and the form of the matrices may be modified at will, provided only the locking devices are adapted to engage in such manner as to hold the spaces rigidly in the predetermined positions.

While my mechanism is designed primarily for use with molds having a continuous slot to produce slugs for printing entire lines of a page or column, it is manifest that molds divided into a number of short lengths for producing short slugs or "logotypes," well known in the art, may be used in connection with my means for determining the length and location of the several matrix groups.

In this art the word "matrices" is used in a generic sense, and includes the spaces or blank matrices, as well as character matrices, rule matrices, etc., and it is in this sense that the word is used herein.

Having thus described my invention, I claim and desire to secure by Letters Patent,—

1. A slotted mold for a line casting machine provided with permanently and uniformly spaced means exterior to the mold slot to engage individual matrices or spaces in the line irrespective of their location therein and hold them against lateral movement.

2. A mold for a line casting machine provided with uniformly spaced teeth to engage individual matrices or spaces in the line irrespective of their location therein and hold them against lateral movement.

3. A mold for a line casting machine provided with a toothed portion at its front, in combination with a composed line of matrices and spaces, certain of which are of a form to engage the said toothed portion, the teeth being so arranged as to permit such engagement irrespective of the location of the matrices in the line.

4. The combination with a composed line divided into groups, of a slotted mold provided with permanently and uniformly spaced means exterior to the mold slot to preserve the relation of such groups irrespective of their location in the line.

In testimony whereof I hereunto set my hand this sixth day of June, 1910, in the presence of two attesting witnesses.

JOHN R. ROGERS.

Witnesses:
 DAVID S. KENNEDY,
 LUCY E. SMITH.

Copies of this patent may be obtained for five cents each, by addressing the "Commissioner of Patents, Washington, D. C."